US009396328B2

(12) United States Patent
Platt et al.

(10) Patent No.: US 9,396,328 B2
(45) Date of Patent: *Jul. 19, 2016

(54) DETERMINING A CONTRIBUTING ENTITY FOR A WINDOW

(75) Inventors: Ryan Platt, New South Wales (AU); Ian Oliver, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1558 days.

This patent is subject to a terminal disclaimer.

(21) Appl. No.: 11/970,123

(22) Filed: Jan. 7, 2008

(65) Prior Publication Data

US 2008/0172631 A1 Jul. 17, 2008

Related U.S. Application Data

(60) Provisional application No. 60/879,959, filed on Jan. 11, 2007.

(51) Int. Cl.
*G06F 21/55* (2013.01)
*G06F 3/0481* (2013.01)

(52) U.S. Cl.
CPC .............. *G06F 21/55* (2013.01); *G06F 3/0481* (2013.01)

(58) Field of Classification Search
USPC .................................................. 715/771, 797
See application file for complete search history.

(56) References Cited

U.S. PATENT DOCUMENTS

| | | | |
|---|---|---|---|
| 6,279,125 B1 * | 8/2001 | Klein | 714/38 |
| 6,389,472 B1 * | 5/2002 | Hughes et al. | 709/229 |
| 6,484,261 B1 * | 11/2002 | Wiegel | 726/11 |
| 7,418,733 B2 * | 8/2008 | Connary et al. | 726/25 |
| 7,743,421 B2 * | 6/2010 | Cosquer et al. | 726/25 |
| 2002/0022474 A1 * | 2/2002 | Blom et al. | 455/410 |
| 2002/0112185 A1 * | 8/2002 | Hodges | 713/201 |
| 2003/0182469 A1 * | 9/2003 | Lok et al. | 709/328 |
| 2003/0236995 A1 * | 12/2003 | Fretwell, Jr. | 713/200 |
| 2004/0044912 A1 * | 3/2004 | Connary et al. | 713/201 |
| 2005/0131992 A1 * | 6/2005 | Goldstein et al. | 709/202 |
| 2006/0005163 A1 * | 1/2006 | Huesken | G06F 9/465 717/107 |
| 2006/0020814 A1 * | 1/2006 | Lieblich et al. | 713/182 |
| 2006/0242711 A1 * | 10/2006 | Anzai et al. | 726/25 |
| 2007/0067842 A1 * | 3/2007 | Greene et al. | 726/24 |
| 2007/0089171 A1 * | 4/2007 | Aharon et al. | 726/22 |
| 2007/0192720 A1 * | 8/2007 | Alsup et al. | 715/769 |
| 2007/0214503 A1 * | 9/2007 | Shulman et al. | 726/22 |
| 2007/0289019 A1 * | 12/2007 | Lowrey | G06F 21/554 726/24 |
| 2008/0127336 A1 * | 5/2008 | Sun | G06F 21/566 726/22 |

* cited by examiner

*Primary Examiner* — Ajay Bhatia
*Assistant Examiner* — Haimei Jiang
(74) *Attorney, Agent, or Firm* — Holland & Hart LLP

(57) ABSTRACT

A method, system, and computer program product for presenting content indicative of one or more entities which contributed to a window being displayed using a processing system. The method comprises determining one or more properties of the window; identifying, using the one or more properties and a set of rules, one or more entities which contributed to the window being displayed; and providing to a user, using the processing system, content indicative of the one or more entities which contributed to the window being displayed.

16 Claims, 6 Drawing Sheets

DETERMINING A CONTRIBUTING ENTITY FOR A WINDOW

The present application claims priority to Provisional Application No. 60/879959 filed Jan. 11, 2007, entitled "Determining a contributing entity for a window," naming the same inventors as in the present application. The present invention generally relates to the field of computing and more particularly to a method, system, computer readable medium of instructions and/or computer program product providing content relating one or more entities which contribute to a window being displayed using a processing system.

TECHNICAL FIELD

The present invention generally relates to the field of computing and more particularly to a method, system, computer readable medium of instructions and/or computer program product providing content relating one or more entities which contribute to a window being displayed using a processing system.

BACKGROUND ART

It can be difficult for a user to determine software entities which contribute, directly or indirectly, to a particular window being displayed using a processing system.

For example, this can particularly be the case for webpages such as "popup windows", as the user may be uncertain whether a particular webpage they are visiting is causing popup windows to be displayed, or whether something else, such as a virus, is causing the popup window to be displayed. In another example, malware might cause the malware's own custom windows to popup on a user's computer.

Similar problems also exist when targeted content is presented to a user via a webpage. For example, a processing system may have a stored cookie which causes targeted information to be presented via a webpage to the user. If the user requires untargeted information, the user may need to delete the cookie from the processing system. However, it can be difficult for the user to determine which cookie contributed to the targeted information being presented to the user via a webpage.

Therefore, there is a need for a method, system, computer program product and/or computer readable medium of instructions which provides content to a user relating to one or more entities which contributed to a window being displayed using a processing system.

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function) generally refers to a function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process is at least one of a running software program or other computing operation, or a part of a running software program or other computing operation, that performs a task.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

A kernel refers to the core part of an operating system, responsible for resource allocation, low-level hardware interfaces, security, etc.

An interrupt is at least one of a signal to a processing system that stops the execution of a running program so that another action can be performed, or a circuit that conveys a signal stopping the execution of a running program.

A system registry is a database used by modern operating systems, for example Windows™ platforms. The system registry comprises information needed to configure the operating system. The operating system refers to the registry for information ranging from user profiles, to which applications are installed on the machine, to what hardware is installed and which ports are registered.

A hash function (i.e. Message Digest, eg. MD5) can be used for many purposes, for example to establish whether a file transmitted over a network has been tampered with or contains transmission errors. A hash function uses a mathematical rule which, when applied to a file, generates a hash value, i.e. a number, usually between 128 and 512 bits in length. This number is then transmitted with the file to a recipient who can reapply the mathematical rule to the file and compare the resulting number with the original number.

An entity can comprise, but is not limited to, a file, an object, a class, a collection of grouped data, a library, a variable, a process, and/or a device.

In a networked information or data communications system, a user has access to one or more terminals which are capable of requesting and/or receiving information or data from local or remote information sources. In such a communications system, a terminal may be a type of processing system, computer or computerized device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realized by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

According to a first broad form, there is provided a method of presenting content indicative of one or more entities which contributed to a window being displayed using a processing system, wherein the method comprises:

determining one or more properties of the window;

identifying, using the one or more properties and a set of rules, one or more entities which contributed to the window being displayed; and providing to a user, using the processing system, content indicative of the one or more entities which contributed to the window being displayed.

According to another broad form, there is provided a system to present content indicative of one or more entities which contributed to a window being displayed using a processing system, wherein the system comprises the processing system being configured to:

determine one or more properties of the window;

identify, using the one or more properties and a set of rules, one or more entities which contributed to the window being displayed; and provide to a user, using the processing system, content indicative of the one or more entities which contributed to the window being displayed.

According to another broad form there is provided a computer program product for a processing system, the computer program product comprising a computer readable medium having a computer program recorded therein or thereon, the computer program product being configured to present content indicative of one or more entities which contributed to a window being displayed using a processing system, wherein the computer program product configures the processing system to:

determine one or more properties of the window;

identify, using the one or more properties and a set of rules, one or more entities which contributed to the window being displayed; and provide to a user, using the processing system, content indicative of the one or more entities which contributed to the window being displayed.

According to another broad form, there is provided a system to present content indicative of one or more entities which contributed to a webpage being displayed using a processing system, wherein the system comprises the processing system being configured to:

determine one or more properties of the webpage;

identify, using the one or more properties and a set of rules, one or more entities which contributed to the webpage being displayed; and provide to a user, using the processing system, content indicative of the one or more entities which contributed to the webpage being displayed.

According to another broad form, there is provided a method of presenting content indicative of one or more entities which contributed to a webpage being displayed using a processing system, wherein the method comprises:

determining one or more properties of the webpage;

identifying, using the one or more properties and a set of rules, one or more entities which contributed to the webpage being displayed; and providing to a user, using the processing system, content indicative of the one or more entities which contributed to the webpage being displayed.

According to another broad form there is provided a computer program product for a processing system, the computer program product comprising a computer readable medium having a computer program recorded therein or thereon, the computer program product being configured to present content indicative of one or more entities which contributed to a webpage being displayed using a processing system, wherein the computer program product configures the processing system to:

determine one or more properties of the webpage;

identify, using the one or more properties and a set of rules, one or more entities which contributed to the webpage being displayed; and provide to a user, using the processing system, content indicative of the one or more entities which contributed to the webpage being displayed.

According to another broad form there is provided a method of presenting content indicative of one or more entities which contributed to a window being displayed using a processing system, wherein the method comprises:

(a) setting the window as a starting entity;

(b) determining one or more properties of the starting entity;

(c) identifying, using the one or more properties and at least one rule, one or more entities related to the starting entity which contributed to the window being displayed; and (d) providing to a user, using the processing system, content indicative of the one or more entities which contributed to the window being displayed.

In one form, the method comprises:

(e) setting the one or more entities as the starting entity;

(f) repeating steps (b), (c) until an end condition is satisfied, wherein the entities identified form a group of entities which contributed to the window being displayed; and (g) providing, to the user, using the processing system, content indicative of the group of entities which contributed to the window being displayed.

In another form, the method comprises selecting the at least one rule from a first set of rules according to the one or more properties of the starting entity.

Optionally, the method comprises the user using an input device of the processing system to drag and drop an icon displayed by the processing system onto the window to thereby initiate the processing system determining the one or more entities which contributed to the window being displayed.

In another optional form, the window is a webpage being displayed by an internet browser.

In one embodiment, the method comprises modifying a title bar of the window to display the content indicative of the one or more entities which contributed to the window being displayed.

In another embodiment, the method comprises:

determining an entity threat value for each entity, the entity threat value being indicative of a level of threat that a respective entity represents to the processing system, wherein the entity threat value is determined based on one or more characteristics of the respective entity; and comparing the entity threat value to an entity threat threshold to identify if the respective entity is malicious.

In one form, each of the one or more characteristics of the respective entity is associated with a respective characteristic threat value, wherein the method comprises calculating the entity threat value using at least some of the characteristic threat values for the one or more characteristics of the respective entity.

In another form, at least one of the one or more characteristics of the respective entity is associated with a characteristic threat value formula, wherein the method comprises calculating, using the characteristic threat value formula, the characteristic threat value.

In an optional form, at least one characteristic threat value is temporally dependent, wherein the method comprises calculating the at least one characteristic threat value for the respective entity using the characteristic threat value formula and a temporal value.

In another optional form, the at least one characteristic is a behaviour associated with the respective entity, wherein the method comprises calculating the at least one characteristic threat value for the respective entity using the characteristic threat value formula and a frequency of instances the behaviour has been performed.

Optionally, the one or more characteristics comprises at least one of one or more legitimate characteristics indicative of non-malicious activity and one or more illegitimate characteristics indicative of malicious activity, wherein the method comprises determining the entity threat value using characteristic threat values associated with the one or more legitimate characteristics and the one or more illegitimate characteristics of the respective entity.

In one embodiment, the step of determining the entity threat value for each entity comprises calculating a difference between the characteristic threat values for the one or more legitimate characteristics of the respective entity, and the characteristic threat values for the one or more illegitimate characteristics of the respective entity, wherein the difference is indicative of the entity threat value.

According to another broad form there is provided a system to present content indicative of one or more entities which contributed to a window being displayed using a processing system, wherein the system comprises the processing system being configured to:

(a) set the window as a starting entity;

(b) determine one or more properties of the starting entity;

(c) identify, using the one or more properties and at least one rule, one or more entities related to the starting entity which contributed to the window being displayed; and (d) provide to a user, using the processing system, content indicative of the one or more entities which contributed to the window being displayed.

In one form, the processing system is configured to:

(e) set the one or more entities as the starting entity;

(f) repeat steps (b), (c) until an end condition is satisfied, wherein the entities identified form a group of entities which contributed to the window being displayed; and (g) provide, to the user, using the processing system, content indicative of the group of entities which contributed to the window being displayed.

In another form, the processing system is configured to select the at least one rule from a first set of rules according to the one or more properties of the starting entity.

In one embodiment, the processing system comprises an input device to enable a user to interact with a graphical user interface displayed by the processing system, wherein the user is able to drag and drop an icon displayed by the processing system onto the window to thereby initiate the processing system to determine the one or more entities which contributed to the window being displayed.

In another embodiment, the window is a webpage being displayed by an internet browser.

In an optional form, the processing system is configured to modify a title bar of the window to display the content indicative of the one or more entities which contributed to the window being displayed.

In another optional form, the processing system is configured to:

determine an entity threat value for each entity, the entity threat value being indicative of a level of threat that a respective entity represents to the processing system, wherein the entity threat value is determined based on one or more characteristics of the respective entity; and compare the entity threat value to an entity threat threshold to identify if the respective entity is malicious.

Optionally, each of the one or more characteristics of the respective entity is associated with a respective characteristic threat value, wherein the processing system is configured to calculate the entity threat value using at least some of the characteristic threat values for the one or more characteristics of the respective entity.

In one form, at least one of the one or more characteristics of the respective entity is associated with a characteristic threat value formula, wherein the processing system is configured to calculate, using the characteristic threat value formula, the characteristic threat value.

In an optional form, at least one characteristic threat value is temporally dependent, wherein the processing system is configured to calculate the at least one characteristic threat value for the respective entity using the characteristic threat value formula and a temporal value.

In another optional form, the at least one characteristic is a behaviour associated with the respective entity, wherein the processing system is configured to calculate the at least one characteristic threat value for the respective entity using the characteristic threat value formula and a frequency of instances the behaviour has been performed.

Optionally, the one or more characteristics comprises at least one of one or more legitimate characteristics indicative of non-malicious activity and one or more illegitimate characteristics indicative of malicious activity, wherein the processing system is configured to determine the entity threat value using characteristic threat values associated with the one or more legitimate characteristics and the one or more illegitimate characteristics of the respective entity.

In one embodiment, the processing system determines the entity threat value for each entity by calculating a difference between the characteristic threat values for the one or more legitimate characteristics of the respective entity, and the characteristic threat values for the one or more illegitimate characteristics of the respective entity, wherein the difference is indicative of the entity threat value.

According to another broad form there is provided a computer program product for a processing system, the computer program product comprising a computer readable medium having a computer program recorded therein or thereon, the computer program product being configured to present content indicative of one or more entities which contributed to a window being displayed using a processing system, wherein the computer program product configures the processing system to:

(a) set the window as a starting entity;
(b) determine one or more properties of the starting entity;
(c) identify, using the one or more properties and at least one rule, one or more entities related to the starting entity which contributed to the window being displayed; and
(d) provide to a user, using the processing system, content indicative of the one or more entities which contributed to the window being displayed.

In one form, the computer program product configures the processing system to:

(e) set the one or more entities as the starting entity;
(f) repeat steps (b), (c) until an end condition is satisfied, wherein the entities identified form a group of entities which contributed to the window being displayed; and
(g) provide, to the user, using the processing system, content indicative of the group of entities which contributed to the window being displayed.

In another form, the computer program product configures the processing system to select the at least one rule from a first set of rules according to the one or more properties of the starting entity.

In one embodiment, the processing system comprises an input device to enable a user to interact with a graphical user interface displayed by the processing system, wherein the computer program product configures the processing system to enable the user to drag and drop an icon displayed by the processing system onto the window to thereby initiate the processing system to determine the one or more entities which contributed to the window being displayed.

In another embodiment, the window is a webpage being displayed by an internet browser.

In an optional form, the computer program product configures the processing system to modify a title bar of the window to display the content indicative of the one or more entities which contributed to the window being displayed.

In another optional form, the computer program product configures the processing system to:

determine an entity threat value for each entity, the entity threat value being indicative of a level of threat that a respective entity represents to the processing system, wherein the entity threat value is determined based on one or more characteristics of the respective entity; and compare the entity threat value to an entity threat threshold to identify if the respective entity is malicious.

Optionally, each of the one or more characteristics of the respective entity is associated with a respective characteristic threat value, wherein the computer program product configures the processing system to calculate the entity threat value using at least some of the characteristic threat values for the one or more characteristics of the respective entity.

In one form, at least one of the one or more characteristics of the respective entity is associated with a characteristic threat value formula, wherein the computer program product configures the processing system to calculate, using the characteristic threat value formula, the characteristic threat value.

In an optional form, at least one characteristic threat value is temporally dependent, wherein the computer program product configures the processing system to calculate the at least one characteristic threat value for the respective entity using the characteristic threat value formula and a temporal value.

In another optional form, the at least one characteristic is a behaviour associated with the respective entity, wherein the computer program product configures the processing system to calculate the at least one characteristic threat value for the respective entity using the characteristic threat value formula and a frequency of instances the behaviour has been performed.

Optionally, the one or more characteristics comprises at least one of one or more legitimate characteristics indicative of non-malicious activity and one or more illegitimate characteristics indicative of malicious activity, wherein the computer program product configures the processing system to determine the entity threat value using characteristic threat values associated with the one or more legitimate characteristics and the one or more illegitimate characteristics of the respective entity.

In one embodiment, the computer program product configures the processing system to determine the entity threat value for each entity by calculating a difference between the characteristic threat values for the one or more legitimate characteristics of the respective entity, and the characteristic threat values for the one or more illegitimate characteristics of the respective entity, wherein the difference is indicative of the entity threat value.

According to another broad form, there is provided a computer readable medium of instructions for giving effect to any of the aforementioned methods, systems and/or computer program products.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
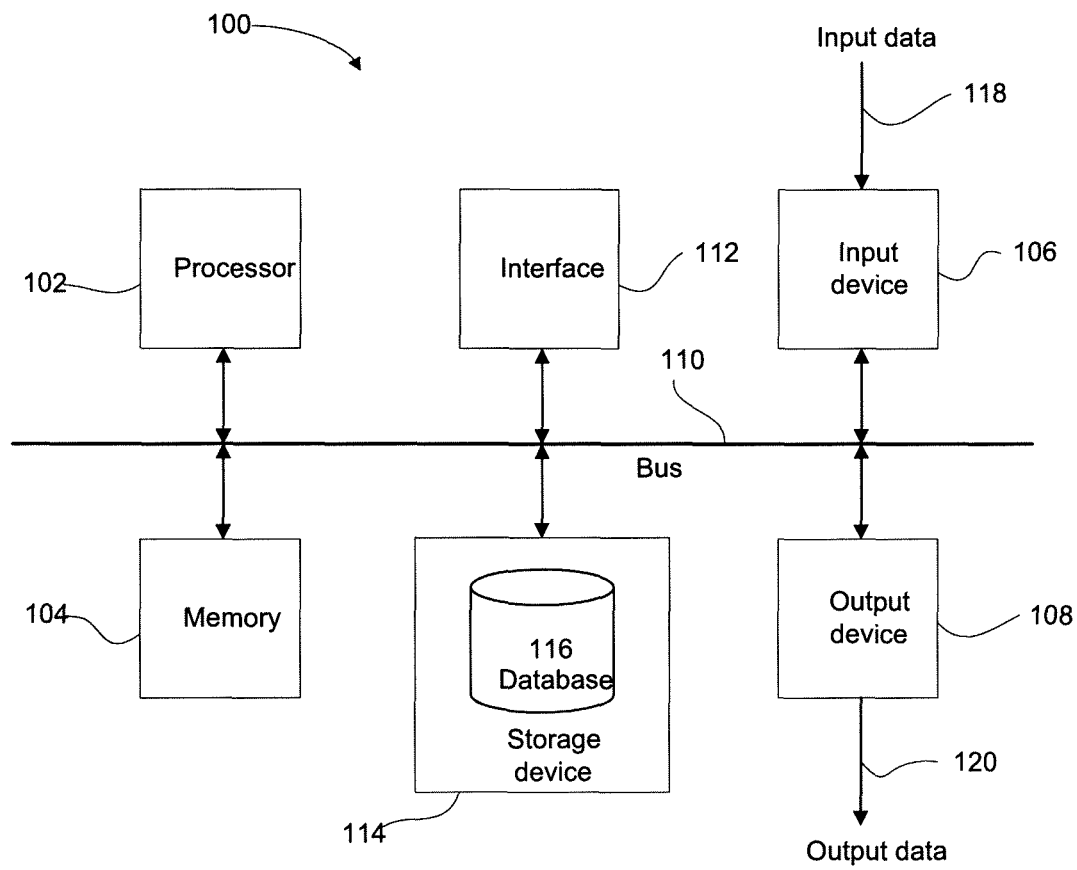
FIG. 1 illustrates a functional block diagram of an example processing system that can be utilized to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realized using a processing system, an example of which is shown in FIG. 1. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100.

Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In a particular embodiment, input data 118 can be a downloaded file or entity and output data 120 can be the identified network location and the physical location of an entity of interest transmitted to a remote processing system.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. More than one input device 106 and/or output device 108 can be provided. It should be appreciated that the processing system 100 may be any form of terminal, server, specialized hardware, or the like.

The processing system 100 may be a part of a networked communications system. Processing system 100 could connect to a network, for example the Internet or a WAN. Input data 118 and output data 120 could be received from or communicated to other devices, such as a server, via the network. The network may form part of, or be connected to, the Internet, and may be or form part of other communication networks, such as LAN, WAN, ethernet, token ring, FDDI ring, star, etc., networks, or mobile telephone networks, such as GSM, CDMA or 3G, etc., networks, and may be wholly or partially wired, comprising for example optical fibre, or wireless networks, depending on a particular implementation.

Figure 2:
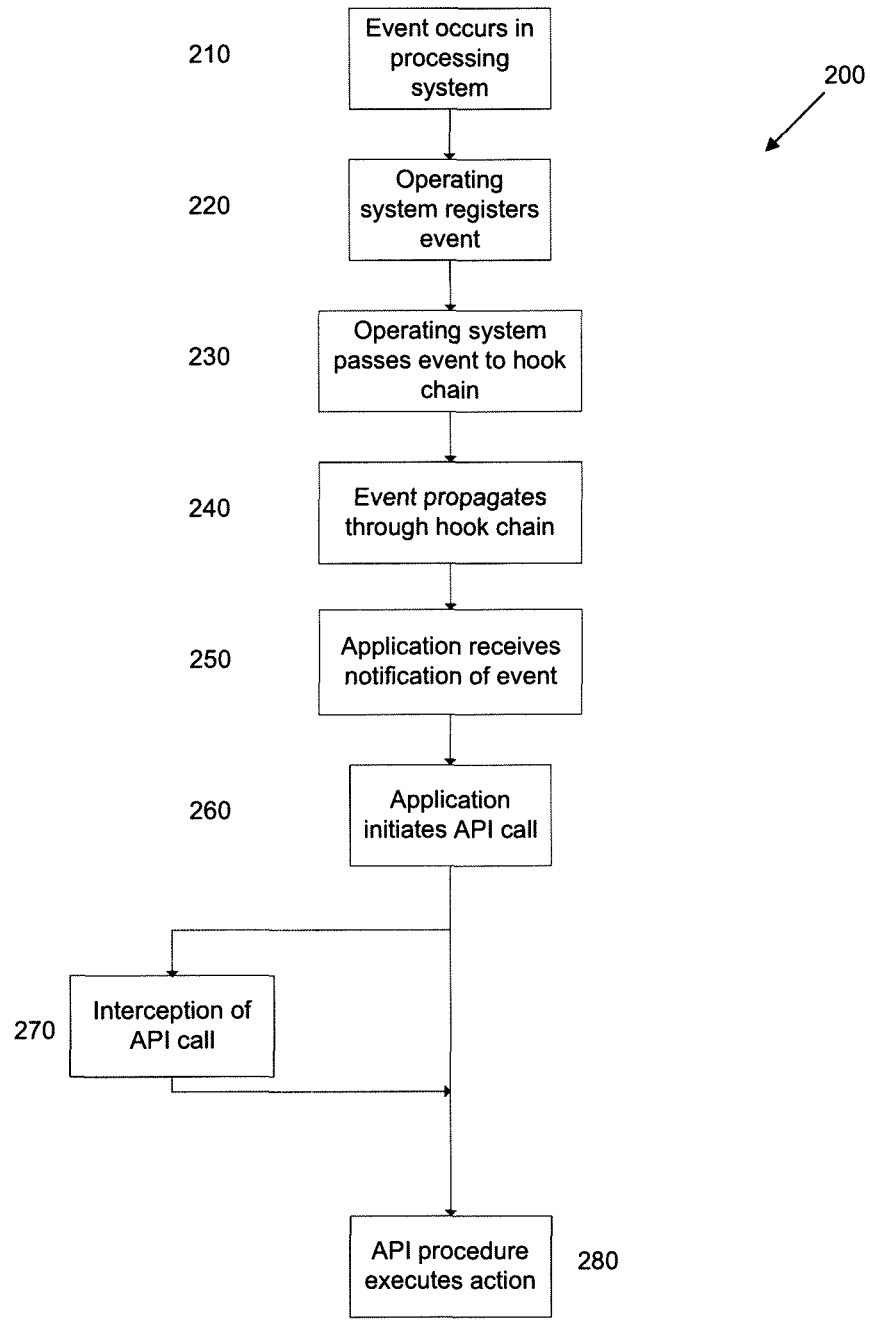
FIG. 2 is a flow diagram illustrating an example of interception.

Referring to FIG. 2 there is shown an example of a method 200 of intercepting activity in a processing system 100.

At step 210, an event occurs in the processing system 100. At step 220, an operating system running in the processing system 100 registers the occurrence of the event. At step 230, the operating system passes the registered event to the hook chain. At step 240, the event is passed to each hook in the hook chain such that different applications, processes, and devices may be notified of the registered event. Once the event has propagated throughout the hook chain, the method 200 comprises at step 250 an application receiving notification of the event being registered by the processing system 100.

At step 260, the method 200 comprises the application initiating an API call to an API procedure so as to carry out a response to the registered event. If an API hook has been established between the API call and the API procedure, the API call is intercepted before it reaches the API procedure at step 270. Processing can be performed by an API hook function once the API call has been intercepted prior to the API procedure being called. The API call may be allowed to continue calling the API procedure at step 280.

Figure 3A:
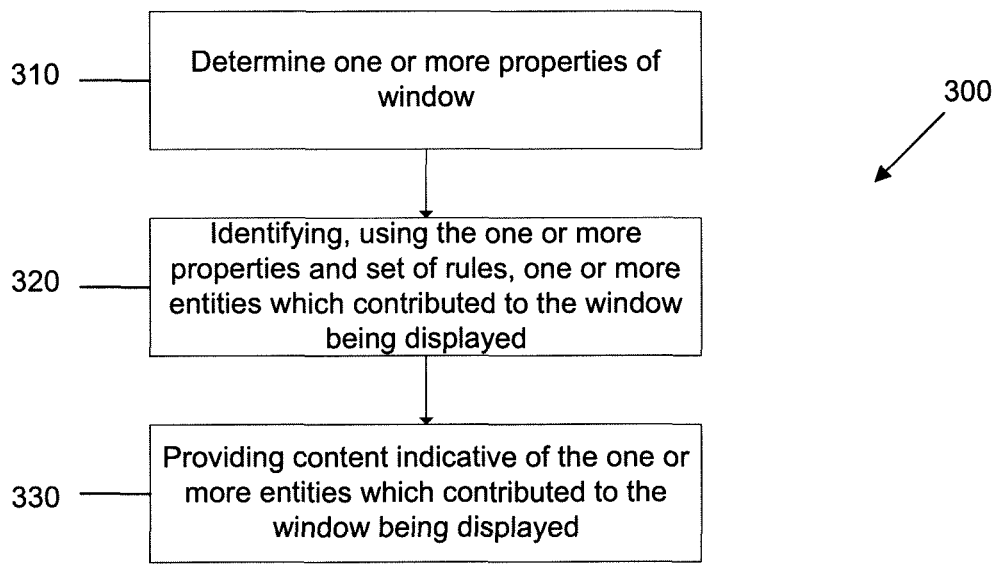
FIG. 3A illustrates a flow diagram illustrating an example method of determining one or more entities which contribute to the display of a window.

Referring to FIG. 3A, there is illustrated a flow diagram representing an example method of determining one or more entities which contribute to a window being displayed in a processing system.

In particular, at step 310 the method 300 comprises determining one or more properties of the window. At step 320, the method 300 comprises identifying, using the one or more properties and a set of rules, one or more entities which contributed to the window being displayed. At step 330, the method comprises providing to a user, using the processing system 100, content indicative of the one or more entities which contributed to the window being displayed.

Figure 3B:
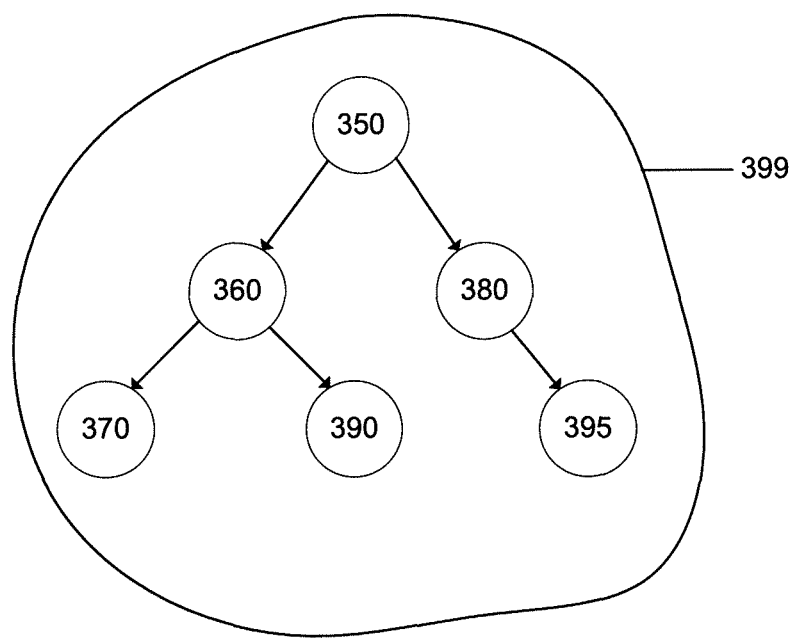
FIG. 3B illustrates a block diagram representing a group of contributing entities relating to the display of a window.

Referring now to FIG. 3B there is shown a block diagram illustrating a group of entities 399 which contributed to a window being displayed using a processing system.

In particular, window 350 (which in a non-limiting example may be a webpage) can have one or more properties which can be used to determine direct entities which contributed to the window being displayed. In this example, the window has a property in the form of a URL (Uniform Resource Locator) which can be used to determine an entity which is related to the display of the window. A search of the memory of the processing system can be performed to determine one or more entities which use or are related to the URL of the window. For example, a search of entities stored in the memory of the processing system can be performed to determine if one or more entities comprise a string equaling the URL. In this example, a search of the processing system memory reveals that a registry entry 360 comprises a value which corresponds to the URL of the window. One or more properties of the registry entity 360 can then be used to determine indirect entities which contributed to the window being displayed. In this instance a time stamp which the registry entity was created can be used to search and determine an indirect contributing entity to the display of the window. In this example, a executable file 370 shares a time stamp substantially similar to the time stamp of the registry entry. Based on this process the contributing entities 399 comprise a registry entity 360 and an executable file 370 which cause the window 350 to be displayed. As illustrated in FIG. 3B, a number of different branches of contributing entities may exist in a group of contributing entities which caused the window to be displayed using the processing system 100.

In another particular example, window 350 can have one or more properties which can be used to determine direct entities which contributed to the window being displayed. For example, the window may have a property in the form of a parent process which can be used to determine an entity which is related to the display of the window. By using a "whitelist" or behavioural analysis of the parent process, it can be determined whether to take a series of actions, possibly comprising: killing the parent process; preventing the parent process from creating additional windows; and/or deleting the file related to the parent process.

Using this approach, content indicative of entities which directly or indirectly contribute to a displayed window can be presented to the user, allowing the user to determine, using this content, an action to perform in relation to the window, such as blocking the window being displayed using the processing system, deleting/quarantining the contributing entities from the memory of the processing system, or allowing the window to continue to be displayed.

Figure 4A:
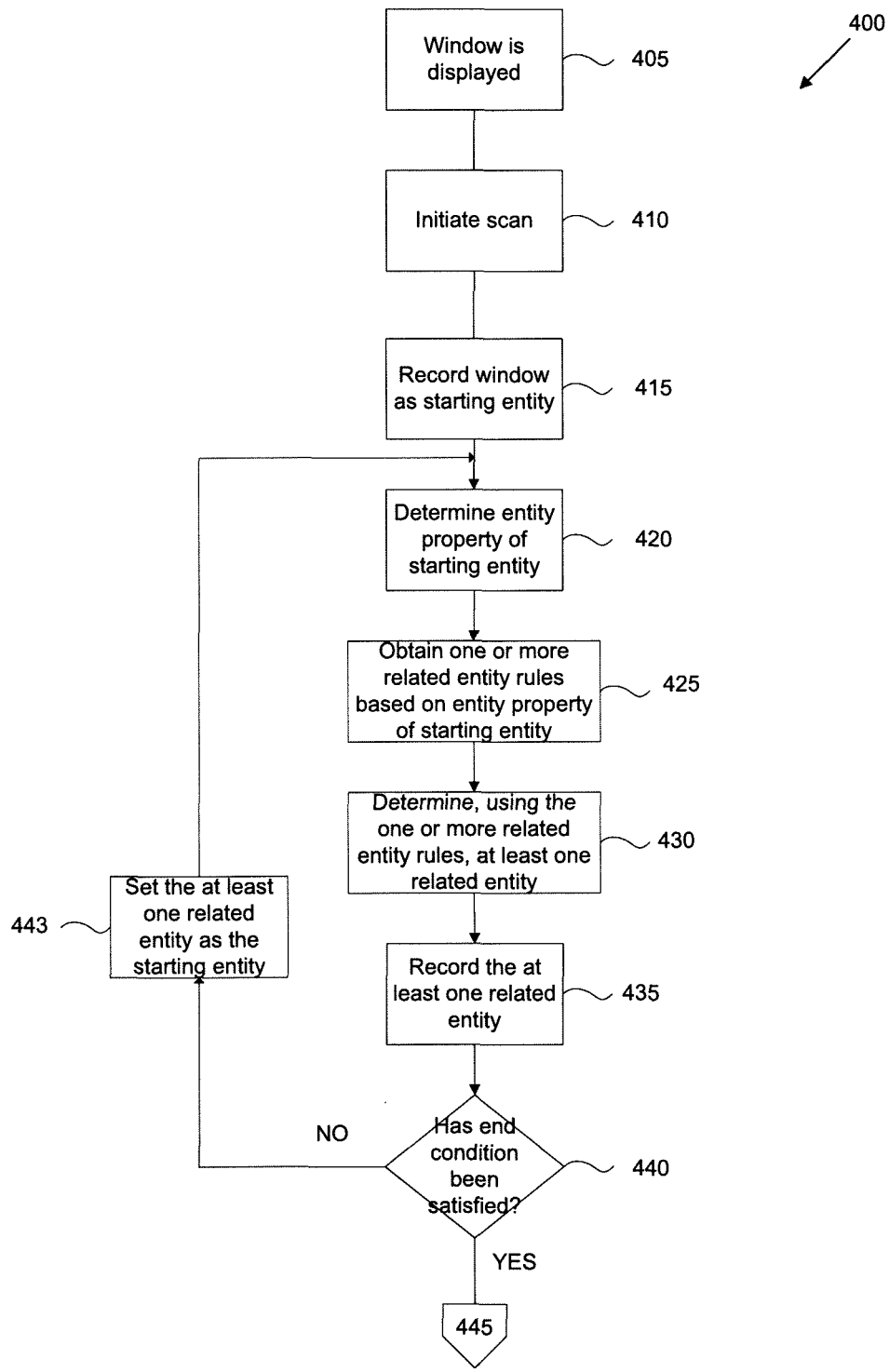
FIGS. 4A and 4B illustrates a flow diagram of a more detailed example method of determining a one or more which contribute to the display of a window.
Figure 4B:
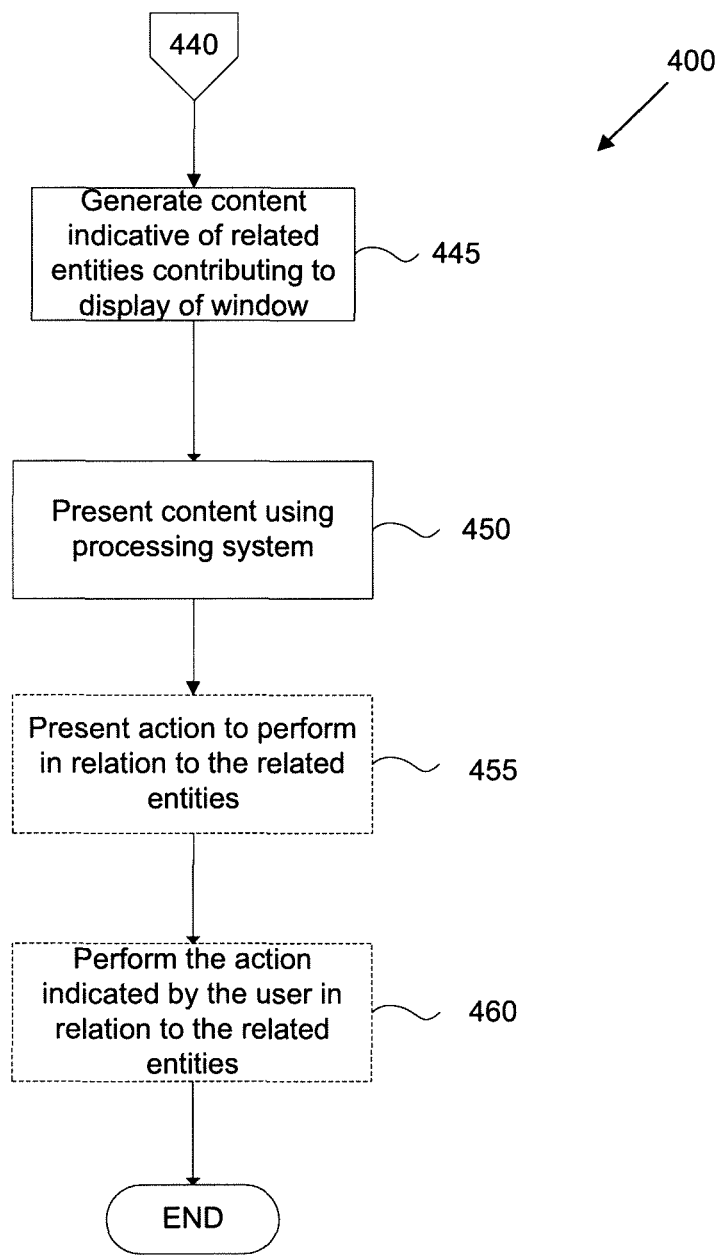

Referring to FIGS. 4A and 4B there is shown a more detailed flow diagram illustrating another example method of determining one or more entities which contribute to the window being displayed using a processing system.

In particular, at step 405 the method 400 comprises a window being displayed using the processing system 100.

At step 410, a user may initiate a scan to determine contributing entities to the display of the window. In one form, an icon indicative of scanning software can be dragged and dropped onto the displayed window, wherein the action of dropping the icon onto the window indicates to the scanning software that entities which contributed to the display of the window are to be identified. Alternatively, the display of the window may automatically initiate the scan to be performed. The window can be considered the starting entity in a chain of related entities, as will be discussed in more detail below.

At step 415, the method comprises recording the window as the starting entity. This can comprise using GetDesktopWindow function or ChildWindowFromPoint function provided in the 'user32.dll' library to obtain a handle on the window for recordal.

Method 400 can be performed as an iterative process, and as such, on the first iteration, the starting entity is the window in question, however, on additional iterations the starting entity may be a direct or indirect contributing entity related to the display of the window. The recordal of the starting entity generally comprises the processing system 100 recording the starting entity in a list or table.

At step 420, one or more properties of the starting entity are determined. The entity property may be an entity type of the entity, such as, but not limited to, whether the starting entity is an executable entity, a webpage from the Internet, a run key entity or a dynamic linked library entity. The entity property may also be a time that the starting entity was created or modified. The entity property may comprise the directory which the starting entity is contained within. The entity property may also be a vendor name associated with the starting entity. The entity property may also be a particular network address from which the starting entity was downloaded.

It will be appreciated that more than one entity property may be determined for the starting entity. However, for the purposes of simplicity, throughout this example it will be assumed that one entity property has been determined for the starting entity.

At step 425, the method 400 comprises selecting, based upon the one or more properties, one or more rules which can be applied to determine related entities to the starting entity which directly or indirectly contributed to the display of the window.

Step 425 can comprise selecting, based on the entity property, the one or more related entity rules from a larger set of related entity rules. Each related entity rule is associated with a particular entity property, and as such, a selection of a related entity rules can be performed based on the entity property of the starting entity. An example list of entity properties and corresponding related entity rules is shown below in List 1.

(i) if the starting entity comprises a vendor name, the at least one related entity is one or more entities comprising the same vendor name;
(ii) if the starting entity comprises a product name, the at least one related entity is one or more entities comprising the same product name;
(iii) if the starting entity comprises a version name, the at least one related entity is one or more entities comprising the same version name;
(iv) if the starting entity was created at a particular time in the one or more processing systems, the at least one related entity is one or more entities which were created at a similar time to that of the starting entity;
(v) if the starting entity accesses a particular network address or network address range or network address names, the at least one related entity is one or more entities which also access the same particular network address or network address range or network address names;
(vi) if the starting entity accesses a particular network address or network address range, the at least one related entity is the particular network address or network address range or network address names;
(vii) if the starting entity causes another process to execute, the at least one related entity is one or more entities which was executed by it;
(viii) if the starting entity was executed by a process, the at least one related entity is one or more entities which executed the starting entity;
(ix) if the starting entity creates or modifies an entity, the at least one related entity is one or more entities which it creates or modifies;
(x) if the starting entity is found in a directory not in a list of whitelist directories, the at least one related entity is one or more entities which also exist in the same directory;
(xi) if the starting entity is downloaded from the internet/tcpip, the at least one related entity is one or more entities which were downloaded at the same time or by the same process or from the same particular network address or network address range or network address names;

List 1: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 1

Further example of Entity Properties and corresponding related entity rules

| Entity Property | Related Entity Rule |
|---|---|
| trigger entity | The one or more related entities are triggerable entities which are triggerable by the run-key entity |

TABLE 1-continued

Further example of Entity Properties and corresponding related entity rules

| Entity Property | Related Entity Rule |
|---|---|
| executable entity | The one or more related entities are one or more files in an INF file associated with the starting entity |
| executable entity | The one or more related entities are one or more trigger entities which trigger the starting entity |
| executable entity | The one or more related entities are one or more favourites which trigger the starting entity |
| executable entity | The one or more related entities are one or more items of embedded executable content inside the starting entity |
| executable entity | The one or more related entities are one or more instances of windows created by the executable entity |
| executable entity | The one or more related entities are one or more desktop link files (short cuts) which trigger the executable entity |
| executable entity | The one or more related entities are one or more modules loaded by the starting entity |
| executable entity | The one or more related entities are one or more classids or guids associated with the starting entity |
| executable entity | The one or more related entities are one or more network addresses or network address ranges or network address names associated with the starting entity |
| classid/guid entity | The one or more related entities are one or more BHO or TOOLBAR names associated with the classid/guid |
| classid/guid entity | The one or more related entities are one or more one or more class names associated with the classid/guid |
| classid/guid entity | The one or more related entities are one or more network addresses or network address ranges or network address names associated with the starting entity |
| classid/guid entity | The one or more related entities are one or more executable entities related to the classid/guid |
| module entity | The one or more related entities are one or more executable entities that are loaded by the module entity |
| network address/network address range/network address name | The one or more related entities are one or more files associated with the network address or network address range or network address name |
| network address/network address range/network address name | The one or more related entities are one or more links or short cuts associated with the network address or network address range or network address name |
| network address/network address range/network address name | The one or more related entities are one or more classids associated with the starting entity |
| network address/network address range/network address name | The one or more related entities are one or more favourites associated to the starting entity |
| network address/network address range/network address name | The one or more related entities are one or more executable entities related to the starting entity |
| network address/network address range/network address name | The one or more related entities are one or more start pages related to the starting entity |
| network address/network address range/network address name | The one or more related entities are one or more cookies related to the starting entity |
| BHO Tool Bar entity | The one or more related entities are one or more classids associated with the starting entity |
| BHO Tool Bar entity | The one or more related entities are one or more names associated with the starting entity |
| BHO Tool Bar entity | The one or more related entities are one or more executable entities executed by the starting entity |
| Favourites entity | The one or more related entities are one or more network addresses or network address ranges or network address names |
| Favourites entity | The one or more related entities are one or more executable entities executed by the starting entity |
| Links entity | The one or more related entities are one or more network addresses or network address ranges or network address names |
| Links entity | The one or more related entities are one or more executable entities executed by the starting entity |
| Cookie entity | The one or more related entities are one or more network addresses or network address ranges or network address names associated with the starting entity |
| windows instance entity | The one or more related entities are one or more executable entities that create the starting entity |
| Directory (not in a whitelist) entity | The one or more related entities are one or more entities that exist in that same directory. |
| INF entity | The one or more related entities are one or more entities referenced in the starting entity |
| Archive entity | The one or more related entities are one or more entities within the archive entity |
| Archive entity | The one or more related entities are one or more entities in the same directory as the archive entity which fail to appear in a whitelist |
| vendor name of entity | The one or more related entities are one or more entities which share the same vendor name as the starting entity |
| product name entity | The one or more related entities are one or more entities which share the same product name as the starting entity |
| version name | The one or more related entities are one or more entities which share the same version name as the starting entity |
| Creation/Modification time of entity | The one or more related entities are one or more entities which have a similar creation/modification time |

It will be appreciated that a starting entity having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 1 that the general entity properties and related entity rules can be extended to specific entity types, such as the entity types shown in Table 1, for example INF entities, Cookies entity, windows instance entity and the like shown above. The more specific rules in Table 1 allow for a more specific selection of rules based on the more specific entity property, which can therefore result in accurately determining the relevant related entity rules.

It will also be appreciated from Table 1 that more than one related entity rule can be obtained based on the one or more entity properties of the starting entity. As shown above in Table 1, if the entity property indicates that the starting entity is an executable entity, then nine separate types of related entity rules can be applicable for determining the related entities to the starting entity.

Additionally or alternatively, in a distributed system, the processing system 100 may transfer, to a remote server processing system, one or more entity properties of the starting entity, and receive, from the remote server processing system, the one or more related entity rules. In this form, the server processing system may select the one or more related entity rules using the entity property from a server set of related entity rules, and then transfer the one or more related entity rules to the processing system.

At step 430, the method comprises applying the selected one or more rules to determine one or more related entities relative to the starting entity which contributed to the window being displayed. For simplicity purposes, the following example is presented using one related entity rule. However, it will be appreciated that more than one related entity rule can be used. Using an example starting entity window which is a webpage having a URL of "www.xyz.com", the following related entity rule can be selected:

"The one or more related entities is a registry entry that has a value corresponding to www.xyz.com"

This related entity rule is then used to determine any registry entities in the processing system 100 which satisfy this rule. Once a scan has been performed using the related entity rule, it may be determined that registry entity 'A' also has a value which corresponds to the URL of the webpage. As the related entity rule has been satisfied, registry entity 'A' is considered a related entity to the starting entity 'www.xyz.com'. As such, a group of related entities has been determined which comprises 'www.xyz.com' and registry value 'A'.

At step 435, the one or more related entities are recorded. This may involve adding the at least one related entity to a list or a table which can comprise the starting entity recorded at step 415. Furthermore, the list or table may comprise data indicative of the relationship between the at least one related entity and entities which have been previously recorded. As such, a chain of related entities which contributed to the webpage being displayed is generated over a number of iterations.

Steps 420 to 435 represent a single iteration to determine a group of related entities. However, if a more detailed group of related entities is required, it is possible to perform multiple iterations, as will now be discussed.

At step 440, the method comprises determining whether an end condition has been satisfied. This may comprise checking against previous recordings whether all the related entities have previously been recorded as a starting entity in previous iterations. If all the related entities for this iteration have previously been used as a starting entity, the end condition has been satisfied, and therefore the method proceeds to step 445. However, in the event that at least one related entity of the current iteration has not been used as a starting entity, then the method proceeds to step 443 wherein the at least one related entity which has not been used as a starting entity is assigned as the starting entity for the next iteration, and then the method proceeds back to step 420 to perform another iteration.

Other end conditions may also exist. For example, when a period of time or a number of processing cycles have elapsed; when the current starting entity has an entity type which is indicative of the end condition; and/or when a selected number of repetitions have been performed.

Once the end condition has been satisfied, step 445 comprises generating content data, wherein the content data is indicative of the group of related entities which contributed to the webpage being displayed using the processing system. The content data may comprise information about each related entity such as whether one or more related entities are suspicious or malicious, the location of the entity (ie. a location in the memory of the processing system and/or a network location which the entity was downloaded), and whether one or more related entities are known as trusted entities.

The generation of content data may comprise performing a search of a database containing information regarding entities which have been downloaded from a network location. If one of the contributing entities corresponds to an entry in the database, content data indicative of the network location which the entity was downloaded from can be generated, as will be explained in more detail below.

The processing system 100 can be configured such that when a file is downloaded from a network location, the network location and corresponding physical location which the file is stored in the memory of the processing system are recorded together. This may comprise recording the network and physical location in a database. When content data is being generated indicative of the contributing entities, a search may be performed of the recorded physical and network locations to determine if the one or more of the related entities were downloaded from a remote network location. If a match of physical locations exists in the database, the corresponding network location can be presented as part of the content data.

In an optional form, an analysis may be conducted of the group of contributing entities to determine if one or more are malicious. In one form the processing system may be configured to comprise an analysis module which can be used to perform an analysis of the contributing entities. The analysis module will be discussed in more detail below.

At step 450, the content data is provided to the user using the processing system. In one form, the content data may be graphically presented in a frame, window or log file. However, in one form, the title bar of the window, in this instance the webpage, may be modified to display the content data such that additional windows do not crowd the user interface. In one form a threat value may be provided to the user indicating a level of threat which the contributing entities represent to the processing system. The threat value may be displayed similarly to the content data, such as in a frame, window, log file, or in the title bar of the window. The threat value may be based on the results of the analysis module 500, as will be explained in more detail below.

Optionally at step 455, the method 400 comprises displaying a number of actions to the user to perform in relation to the webpage based on the list of related entities. The number of actions may comprise block the webpage, delete one or more suspicious or malicious related entities which contributed to the webpage being displayed, transfer data indicative of the group of related entities which contributed to the displayed webpage to a remote server processing system for further analysis. If one of the actions is selected by the user using the processing system, the action is performed at step 460.

Figure 5:
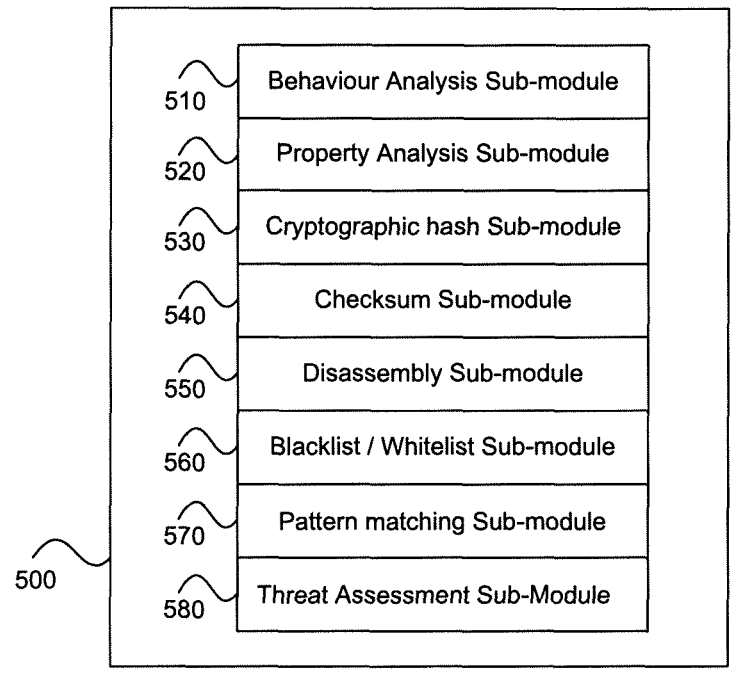
FIG. 5 illustrates a block diagram illustrating an example of an analysis module.

Referring to FIG. 5, there is shown a block diagram of an example of an analysis module 500. The analysis module 500 comprises a number of sub-modules which the analysis module 500 can control and use individually or in combination to determine if the one or more contributing entities have compromised the processing system.

The analysis module 500 can comprise a behaviour analysis sub-module 510, a property analysis sub-module 520, a cryptographic hash sub-module 530, a checksum sub-module 540, a disassembly sub-module 550, a black-list/white-list sub-module 560, a pattern matching sub-module 570, and a threat assessment sub-module 580.

Data returned by the above sub-modules can be indicative of whether the one or more entities are associated with malware. However, data returned from one sub-module may require further processing by one or more other sub-modules.

Therefore, the analysis module 500 may be configured to pass data requiring further processing onto the appropriate sub-module(s) to thereby determine if the one or more entities are associated with malware.

The behaviour analysis sub-module 510 comprises a plurality of behaviour rules. The analysis module 500 passes the behaviour analysis sub-module 510 one or more entities which require behaviour analysis.

The behaviour analysis sub-module 510 can comprise the following example behaviour rules:
  Was the contributing entity launched by the user?
  Is the contributing entity attempting to connect to a remote network?
  Is the contributing entity requesting activity to be performed at regular intervals?

The behaviour analysis sub-module 510 can return data to the analysis module 500 indicative of the behaviour rules which were satisfied. As will be explained in more detail below in relation to the threat assessment module 580, the number of satisfied behaviour rules, or threat values associated with satisfied behaviour rules can be used to determine whether the processing system is compromised with malware.

The behaviour analysis sub-module 510 may also query an event log file to determine whether particular behaviour rules are satisfied. The event log file may be generated by intercepting particular events that occur in the processing system 100 which are generally associated with malicious behaviour. The events may be intercepted using hook functions and API interception. For example, the last example behaviour rule above may require a search to be performed of the event log file to determine if a contributing entity is requesting a particular activity to be performed at regular intervals. Furthermore, the behaviour analysis sub-module 510 may query the event log file to determine if a sequence of events have been intercepted which are indicative of the processing system being compromised with malware.

The property analysis sub-module 520 is configured to determine one or more properties of one or more contributing entities. The property analysis sub-module 520 receives one or more entities from the analysis module 500 and applies one or more property rules to determine one or more properties of the one or more contributing entities which can be used in determining if the processing system has been compromised with malware.

Property rules can be configured to determine illegitimate properties of an entity which is generally associated with malware, and/or legitimate properties of an entity which is not generally associated with malware. The property analysis sub-module 520 can comprise the following example property rules:
  Is the entity configured to be hidden in the processing system memory?
  Is the entity located in a system directory of the operating system (ie. "C:\Windows\system32\")?
  Has the entity been modified recently?
  Does the entity have a tray icon?
  Does the entity have unlimited file permissions (ie read, write, and execute)

Data indicative of satisfied property rules can be returned to the analysis module 500. As will be explained in more detail regarding the threat assessment sub-module 580, the number of satisfied property rules or threat values associated with satisfied property rules can be used to determine whether the one or more entities are associated with malware.

The cryptographic hash sub-module 530 is configured to generate a cryptographic hash value of a contributing entity received from the analysis module 500. As the cryptographic hash value can be used as an identity, the cryptographic hash value can be used in comparisons with the blacklist/whitelist sub-module 560 to determine whether one or more contributing entities are associated with malware.

Data indicative of whether the one or more contributing entities is associated with malware is returned to the analysis module 500. If the analysis module 500 receives data indicating that the one or more contributing entities are associated with malware, content data is generated to indicate that one or more contributing entities is malicious.

The checksum sub-module 540 is configured to determine a checksum of one or more contributing entities. The checksum can be compared to a database (blacklist/whitelist module) to determine whether the one or more entities received from the analysis module are malicious.

The disassembly sub-module 550 is configured to disassemble binary code of one or more contributing entities received from the analysis module 500 such that the disassembly sub-module 550 determines processing system instructions. The processing system instructions of the one or more contributing entities can then be used by the pattern matching sub-module 570 to determine whether the one or more entities is associated with malware. Data indicative of disassembled instructions are returned to the analysis module 500, wherein the analysis module 500 transfers the disassembled instructions to the pattern matching sub-module 570 to determine whether the one or more disassembled instructions of the one or more contributing entities is associated with malware.

The blacklist/whitelist sub-module 560 comprises a list of malicious and/or non-malicious entities associated with malware. The blacklist/whitelist sub-module 560 may be provided in the form of a table or database which comprises data indicative of malicious and non-malicious entities. The table may comprise checksums and cryptographic hash values for malicious and non-malicious entities. The data stored in the blacklist/whitelist sub-module can be used to determine whether one or more contributing entities received from the analysis module 500 is malicious or non-malicious. Data indicative of whether the one or more contributing entities is associated with malware is returned to the analysis module 500.

The pattern matching sub-module 570 is configured to search one or more contributing entities, received from the analysis module 500, for particular patterns of strings or instructions which are indicative of malicious activity. The pattern matching sub-module 570 may operate in combination with the disassembly module 550. Although strings of instructions can be compared by the pattern matching sub-module 570, the pattern matching sub-module 570 may be configured to perform functional comparisons of groups of instructions to determine whether the functionality of the one or more entities is indicative of malware. Data indicative of whether the one or more entities is associated with malware is returned to the analysis module 500.

The threat assessment sub-module 580 is configured to determine, using the received data from the analysis module 500, a threat value indicative of the risk which the one or more contributing entities represents to the processing system.

The threat assessment sub-module 580 receives, from the analysis module 500, data indicative of one or more satisfied behaviour rules for one or more contributing entities, and/or one or more satisfied property rules for one or more contributing entities. Additional data may be received by the threat assessment module 580 indicative of the relatedness of contributing entities in the group relative to the displayed webpage. The relatedness of entities may be provided in the form of link distances.

The determined threat value can then be compared to a threshold to determine if the one or more contributing entities are malicious. Data indicative whether the one or more contributing entities is malicious is returned to the analysis module 500, wherein content data is generated for presentation to the user.

The threat value can take three different forms: an entity threat value (ETV), a relational entity threat value (RETV), and a group threat value (GTV). Each of these values, and a method for calculating each, will be discussed in more detail below.

An ETV is indicative of the threat that a single contributing entity represents to the processing system.

The threat assessment sub-module 580 can be configured to determine a characteristic threat value (CTV) for each satisfied behaviour rule and/or property rule for a contributing entity. The threat assessment sub-module 580 can comprise a CTV formula associated with each behaviour rule and/or property rule used by the behaviour analysis sub-module 510 and the property analysis sub-module 520. If a behaviour or property rule has been satisfied, as indicated by the received data, the corresponding CTV formula is used to calculate the CTV for the respective behaviour or property rule for the entity. The CTVs are then used by the threat assessment sub-module 580 to determine the ETV for the contributing entity.

Some CTV formulas can be configured to assign a constant CTV for the satisfied behaviour rule or property rule. For example, if the contributing entity has a hidden property, the associated CTV formula may assign a constant value indicative a level of threat that the hidden property represents to the processing system 100, as shown below:

$$CTV=0.3$$

In additional or alternative forms, CTV formulas can be configured to use a recorded frequency as an input when calculating the CTV. For example, if one of the satisfied behaviour rules indicates that the contributing entity has caused the processing system to connect to a remote network address on ten occasions, the CTV is adjusted according to the frequency of the behaviour, as shown below:

$$CTV = 0.01 \times \text{freq} = 0.01 \times 10 = 0.1$$

The frequency may also be determined for a period of time. For example, if the contributing entity is connected to the remote network address on ten instances within the past five minutes, then the CTV is adjusted accordingly for this frequency within this period of time. The frequency over a period of time may be determined by the analysis module using the intercepted request log file.

In further additional or alternative forms, at least one CTV is temporally dependent. The CTV formula can be configured to calculate the CTV using a temporal value. For example, a contributing entity may have connected to a remote network ten days ago. Again, the temporal value may be determined using the intercepted request log file. This period of time is used by the CTV formula in determining the CTV, as shown below:

$$CTV = 0.1 \times e^{\frac{1}{Time}} = 0.1 \times e^{\frac{1}{10}} = 0.1 \times 1.11 = 0.12$$

In the event that the contributing entity caused the processing system 100 to connect to the remote network address one day ago, the CTV would be calculated as:

$$CTV = 0.1 \times e^{\frac{1}{Time}} = 0.1 \times e^{\frac{1}{1}} = 0.1 \times 2.72 = 0.27$$

As can be seen from the above CTVs, the CTV formulas can be configured to determine a CTV according to how malicious the behaviour or property rule satisfied is considered for the processing system.

Behaviour and property rules can be indicative of non-malicious and malicious activity. CTVs for legitimate characteristics and illegitimate characteristics can be calculated using the associated CTV formulas. In one form, illegitimate characteristics have a positive CTV, and legitimate characteristics have a negative CTV. However, it will be appreciated that this is not essential.

Once CTVs for the satisfied behaviour and property rules have been determined, the threat assessment module determines an ETV for the contributing entity using the determined CTVs.

For example, a contributing entity may have the following CTVs:
CTV1=0.1
CTV2=0.5
CTV3=0.7
CTV4=−0.4

Referring to the above CTVs, four characteristics of the contributing entity have been determined. Three of the characteristics are illegitimate (as indicated by the positive CTVs) and one of the characteristics is legitimate (as indicated by the negative CTV). The ETV can be determined by summing the CTVs for the contributing entity. In this example the ETV would be calculated as:

$$ETV = \sum_{x=1}^{4} CTVx = 0.1 + 0.5 + 0.7 - 0.4 = 0.9$$

In some instances an ETV may have been previously calculated for the contributing entity and recorded in the processing system's 100 memory. In this event, the new ETV can be determined by using the CTVs and the previously stored ETV. The previous stored ETV can be weighted accordingly.

The threat assessment module is configured to compare the ETV of the contributing entity to the ETT to determine if the contributing entity is malicious. In one form, if the ETV is greater than or equal to the ETT, the contributing entity is identified as being malicious.

For example, the ETT may be equal to '0.85'. In this example the ETV equals '0.9' which is greater than the ETT. Therefore, the contributing entity is identified as being a malicious entity, thereby identifying that the processing system has been compromised with malware.

An RETV is a threat value for a single contributing entity which is calculated according to one or more adjusted ETVs of related contributed entities relative to the single contributing entity. In this instance, the single contributing entity is the original starting entity in the group of related entities.

Figure 6:
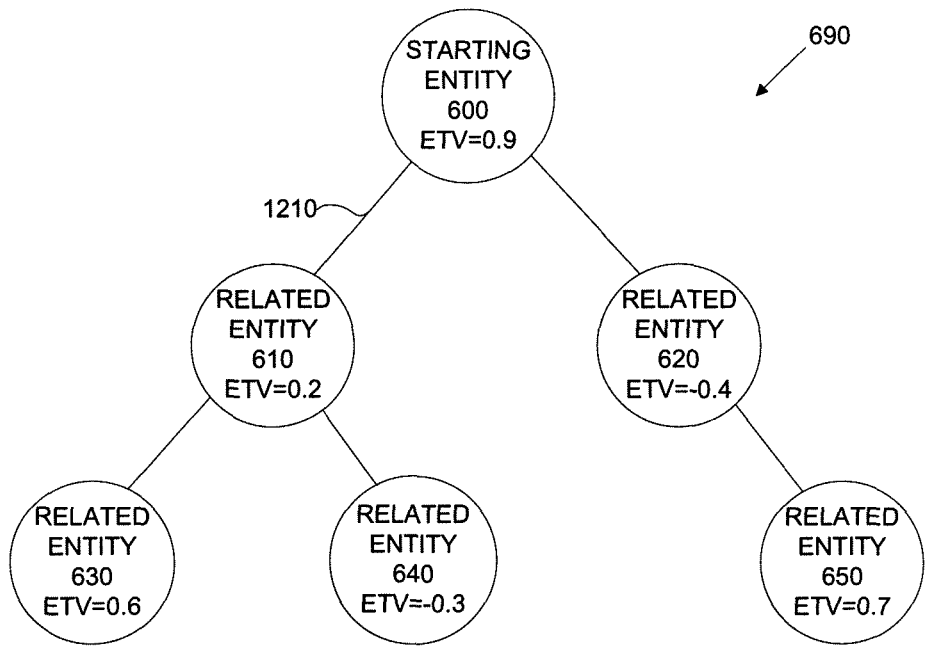
FIG. 6 illustrates a flow diagram of an example of a group of contributing entities.

Referring to FIG. 6, there is shown a group of related entities 690 and corresponding ETVs for each entity in the group. The RETV can be calculated by summing ETVs for each entity in the group which is adjusted according to the relatedness of each entity relative to the starting entity. In one form, the link distance is used to adjust the ETVs for each entity in the group.

Therefore, a related entity which has a direct link (ie. a low link distance) to the starting entity is given more weight compared to a related entity which has an indirect link (ie. a higher link distance) to the starting entity. The higher the link distance, the less weight is provided for the respective ETV when calculating the RETV. An example RETV formula to calculate the RETV is provided below:

$$RETV = \Sigma ETV \times 0.5^{LinkDistance}$$

For example, the RETV for the group of related entities 690 illustrated in FIG. 6 would be calculated as:

$$RETV = \Sigma ETV \times 0.5^{LinkDistance}$$

$$RETV = 0.9 \times 0.5^0 + (0.2 - 0.4) \times 0.5^1 + (0.6 - 0.3 + 0.7) \times 0.5^2$$

$$RETV = 0.9 - 0.1 + 0.25 = 1.05$$

The RETV can then be compared to a relational entity threat threshold (RETT) to determine whether the contributing entity, based at least partially on the related entities 610, 620, 630, 640, 650, is malicious. In this example, the RETT may be '0.8'. Therefore, the RETV is greater than RETT, thereby identifying the starting entity as a malicious entity, and thereby identifying that the processing system is compromised with malware.

The GTV can be calculated by summing the ETVs for each entity 600, 610, 620, 630, 640, 650 in the group of related entities 690, and then averaging the sum over the number of entities in the group 690. An example GTV formula to calculate the GTV is provided below:

$$GTV = \frac{\sum ETV}{n}$$

where n is the number of entities in the group of related entities 690

Referring to the group of related entities 690 shown in FIG. 6, the GTV would be calculated as:

$$GTV = \frac{\sum ETV}{n}$$

$$GTV = \frac{0.9 + 0.2 - 0.4 + 0.6 - 0.3 + 0.7}{6}$$

$$GTV = \frac{1.7}{6} = 0.28$$

The GTV can then be compared to a group threat threshold (GTT) to determine whether the group of related entities 690 is malicious, or whether at least a portion of the related entities 690 is malicious. In this example, the GTT may be '0.2'. In this instance, the GTV is more than the GTT which indicates that the group of related entities 690 is malicious, thereby identifying that the processing system has been compromised with malware.

In one form, in the event that windows are continually displayed on the screen, such that interface is flooded with new windows being displayed, the method may comprise intercepting new requests to display a window once the scan is initiated, and restricting the request being performed. The processing system may be configured to monitor the number of new windows being displayed over a period of time, wherein the number is compared to a threshold. In the event of a successful comparison, the processing system may intercept any new requests to display a new window wherein each request is ignored. Once the number of windows being displayed has been placed under control, the user may then indicate, using the input device of the processing system, that requests can again be processed such that new windows may be displayed using the processing system.

Other information can additionally or alternatively be stored and used to search the database to determine if a contributing entity was downloaded from a remote network location.

For example, it may be desirable to record identifying information, such as file name and location, of an entity (eg. a file) that is responsible for downloading a file to processing system 100. In this way if the file ends up being identified as a contributing entity to the display of the window, there exists identifying information of the entity responsible for downloading the file which can also be presented to the user.

It may also be desirable to record at least some of the events performed in processing system 100 by at least some of the files downloaded to processing system 100. This can provide a useful record of files that may have initiated further downloads or be related to other files. This may also show the creation of executable files by other executable files. This can be beneficial as file behaviours can be monitored for triggers and also to ensure that a complete trail of events for the creation of all entities/files can be reconstructed.

By knowing event history the recorded network locations and the recorded physical locations can also be searched for any files that may have been downloaded by an identified contributing entity. Furthermore, the recorded network locations and physical locations can be searched for any file which may have downloaded or created the one or more identified contributing entities.

Preferably, the network location is a Uniform Resource Locator (URL). It should be noted that some requests for files can comprise additional information as well as a URL and any such additional information can be recorded with the URL as the network location. Also preferably, recording of network locations and physical locations in the processing system are recorded continuously. It is also possible to record the network locations and/or physical locations of all files downloaded to the processing system. Alternatively, network locations and/or physical locations of only certain types of files downloaded to the processing system may be recorded. Types of files may comprise executable, archive, library and/or data files.

It is also possible to record the hash value (i.e. Message Digest, eg. MD5) for some or all files downloaded to the processing system. This allows the hash value to be optionally provided to the server processing system for a contributing entity. Furthermore, it is possible to automatically generate a sliding fit signature for a contributing entity which can also be transmitted to the remote processing system.

When several network locations of related entities are recorded or transmitted, the network locations can be recorded or stored as a related group of network locations. It is also possible to store relationship information between any related network locations.

Thus, network locations can be received at the remote processing system relatively quickly. This allows the remote processing system to automatically, or for researchers or analysts to manually, download the contributing entity before the network location is no longer valid. A record of all bad network locations found can also be kept to warn users who may visit the network locations in the future. This means that any contributing entities, which may be threats, can be obtained from the original network location rather than from a user's processing system.

In a particular form, all downloading entities can be monitored or only certain types of downloading entities can be monitored. For example, all executable files or archives containing an executable file may be monitored as downloading entities. Method 400 may initiate when the entity is in the process of downloading or has downloaded.

A network driver can be used to intercept all network activity involving processing system 280 to provide monitoring of downloading entities.

The creation of the new file can be identified by making use of event hooking. Techniques that can be utilized comprise API hooking, kernel mode driver, system callbacks or polling all file creations. Each time a new file is created it can be checked against one or more of the downloaded entities by making a comparison of the respective hash functions (i.e. MD5), file sizes, series of sections, and/or file names.

Information in the second record thus contains the desired information of a list of file names with respective network locations of the originating network source. The network location provides the full pathway and not just a base address.

In another optional form, particular content displayed in the window may be used in combination with recorded packets of network traffic to determine a network location of a contributing entity. For example, if the window comprises content relating to "Bob's Factory Clearance", then a search of recorded network traffic may be performed in an attempt to determine if a packet of data has been received which comprises data indicative of the string "Bob's Factory Clearance". If a packet of data is found in the recorded network traffic, the packet of data can be used to determine a network location of the contributing entity.

The above-described method, system, and computer program product may take the form of an entirely hardware embodiment, an entirely software embodiment, firmware, or an embodiment combining software, hardware and/or firmware aspects.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A method of presenting content indicative of one or more entities which contributed to a window being displayed using a processing system, wherein the method comprises:
   (a) setting the window as a starting entity, wherein the window comprises a webpage being displayed by an internet browser, the webpage having a uniform resource locator (URL);
   (b) determining one or more properties of the starting entity, the one or more properties including the URL of the webpage;
   (c) identifying, using the one or more properties and at least one rule, the one or more entities related to the starting entity which contributed to the window being displayed, wherein identifying the one or more entities comprises:
      identifying a registry entry that corresponds to the starting entity based at least in part on a determination that a value of the registry entry corresponds to the URL of the webpage;
      determining a timestamp associated with the registry entry;
      identifying one or more files of the processing system with timestamps within a predetermined range of the timestamp associated with the registry entry; and
      indicating each identified file as a contributing entity;
   (d) determining, for each of the one or more entities related to the starting entity, whether a direct link or an indirect link exists from a related entity to the starting entity;
   (e) determining a link distance value between the starting entity and each of the one or more entities related to the starting entity;
   (f) determining, for each of the one or more entities related to the starting entity, a threat value based at least in part on one or more characteristics of a respective entity related to the starting entity, wherein the one or more characteristics of the respective entity related to the starting entity comprise at least a frequency of connecting to a remote network address within the predetermined range of the timestamp associated with the registry entry;
   (g) determining a weighted value for each of the one or more entities related to the starting entity, wherein the weighted value comprises at least the link distance value;
   (h) identifying whether each of the one or more entities related to the starting entity is malicious or non-malicious, wherein the identification comprises determining whether the threat value is below a threshold value; and
   (i) providing to a user, using the processing system, content indicative of the one or more entities which contributed to the window being displayed, the content including the determined threat value for each of the one or more related entities.

2. The method according to claim 1, wherein the method comprises:
   (j) setting the one or more entities as the starting entity;
   (k) repeating steps (b) through (h) until an end condition is satisfied, wherein the entities identified form a group of entities which contributed to the window being displayed; and
   (l) providing, to the user, using the processing system, content indicative of the group of entities which contributed to the window being displayed.

3. The method according to claim 1, wherein the method comprises selecting the at least one rule from a first set of rules according to the one or more properties of the starting entity.

4. The method according to claim 1, wherein the method comprises the user using an input device of the processing system to drag and drop an icon displayed by the processing system onto the window to thereby initiate the processing system determining the one or more entities which contributed to the window being displayed.

5. The method according to claim 1, wherein the method comprises modifying a title bar of the window to display the content indicative of the one or more entities which contributed to the window being displayed.

6. The method according to claim 1, wherein each of the one or more characteristics of the respective entity related to the starting entity is associated with a respective characteristic threat value.

7. The method according to claim 6, wherein at least one of the one or more characteristics of the respective entity is associated with a characteristic threat value formula, wherein the method comprises calculating, using the characteristic threat value formula, the characteristic threat value.

8. The method according to claim 7, wherein at least one characteristic threat value is temporally dependent, wherein the method comprises calculating the at least one characteristic threat value for the respective entity using the characteristic threat value formula and a temporal value.

9. A system to present content indicative of one or more entities which contributed to a window being displayed using a processing system, wherein the system comprises the processing system being configured to:
(a) set the window as a starting entity, wherein the window comprises a webpage being displayed by an internet browser, the webpage having a uniform resource locator (URL);
(b) determine one or more properties of the starting entity, the one or more properties including the URL of the webpage;
(c) identify, using the one or more properties and at least one rule, the one or more entities related to the starting entity which contributed to the window being displayed, wherein identifying the one or more entities comprises the steps of:
identifying a registry entry that corresponds to the starting entity based at least in part on a determination that a value of the registry entry corresponds to the URL of the webpage;
determining a timestamp associated with the registry entry;
identifying one or more files of the processing system with timestamps within a predetermined range of the timestamp associated with the registry entry; and
indicating each identified file as a contributing entity;
(d) determine, for each of the one or more entities related to the starting entity, whether a direct link or an indirect link exists from a related entity to the starting entity;
(e) determine a link distance value between the starting entity and each of the one or more entities related to the starting entity;
(f) determine, for each of the one or more entities related to the starting entity, a threat value, based at least in part on one or more characteristics of a respective entity related to the starting entity, wherein the one or more characteristics of the respective entity related to the starting entity comprises at least a frequency of connecting to a remote network address within the predetermined range of the timestamp associated with the registry entry;
(g) determine a weighted value for each of the one or more entities related to the starting entity, wherein the weighted value comprises at least the link distance value;
(h) identify whether each of the one or more entities related to the starting entity is malicious or non-malicious, wherein the identification comprises determining whether the threat value is below a threshold value; and
(i) provide to a user, using the processing system, content indicative of the one or more entities which contributed to the window being displayed, the content including the determined threat value for each of the one or more related entities.

10. The system according to claim 9, wherein the processing system is configured to:
(j) set the one or more entities as the starting entity;
(k) repeat steps (b) through (h) until an end condition is satisfied, wherein the entities identified form a group of entities which contributed to the window being displayed; and
(l) provide, to the user, using the processing system, content indicative of the group of entities which contributed to the window being displayed.

11. The system according to claim 9, wherein the processing system is configured to select the at least one rule from a first set of rules according to the one or more properties of the starting entity.

12. The system according to claim 9, wherein the processing system comprises an input device to enable a user to interact with a graphical user interface displayed by the processing system, wherein the user is able to drag and drop an icon displayed by the processing system onto the window to thereby initiate the processing system determining the one or more entities which contributed to the window being displayed.

13. The system according to claim 9, wherein the processing system is configured to modify a title bar of the window to display the content indicative of the one or more entities which contributed to the window being displayed.

14. The system according to claim 9, wherein each of the one or more characteristics of the respective entity related to the starting entity is associated with a respective characteristic threat value.

15. The system according to claim 14, wherein at least one of the one or more characteristics of the respective entity is associated with a characteristic threat value formula, wherein the processing system is configured to calculate, using the characteristic threat value formula, the characteristic threat value.

16. A computer program product for a processing system, the computer program product comprising a non-transitory computer readable medium having a computer program recorded therein or thereon, the computer program product being configured to present content indicative of one or more entities which contributed to a window being displayed using a processing system, wherein the computer program product configures the processing system to:
(a) set the window as a starting entity, wherein the window comprises a webpage being displayed by an internet browser, the webpage having a uniform resource locator (URL);
(b) determine one or more properties of the starting entity, the one or more properties including the URL of the webpage;
(c) identify, using the one or more properties and at least one rule, the one or more entities related to the starting entity which contributed to the window being displayed, wherein identifying the one or more entities comprises the computer program product configuring the processing system to:
identify a registry entry that corresponds to the starting entity based at least in part on a determination that a value of the registry entry corresponds to the URL of the webpage;
determine a timestamp associated with the registry entry;
identify one or more files of the processing system with timestamps within a predetermined range of the timestamp associated with the registry entry; and
indicate each identified file as a contributing entity;

(d) determine, for each of the one or more entities related to the starting entity, whether a direct link or an indirect link exists from a related entity to the starting entity;
(e) determine a link distance value between the starting entity and each of the one or more entities related to the starting entity;
(f) determine, for each of the one or more entities related to the starting entity, a threat value, based at least in part on one or more characteristics of a respective entity related to the starting entity, wherein the one or more characteristics of the respective entity related to the starting entity comprises at least a frequency of connecting to a remote network address within the predetermined range of the timestamp associated with the registry entry;
(g) determine a weighted value for each of the one or more entities related to the starting entity, wherein the weighted value comprises at least the link distance value;
(h) identify whether each of the one or more entities related to the starting entity is malicious or non-malicious, wherein the identification comprises determine whether the threat value is below a threshold value; and
(i) provide to a user, using the processing system, content indicative of the one or more entities which contributed to the window being displayed, the content including the determined threat value for each of the one or more related entities.

* * * * *